United States Patent
Banda et al.

(10) Patent No.: US 11,618,811 B2
(45) Date of Patent: Apr. 4, 2023

(54) COMPOSITION FOR TRANSFORMING POLYETHYLENE INTO A DECOMPOSABLE MATERIAL AND ITS PROCESS OF PRODUCTION THEREOF

(71) Applicant: BALA INDUSTRIES AND ENTERTAINMENT PRIVATE LIMITED, Pune (IN)

(72) Inventors: Rao Balaji Banda, Pune (IN); Wadhwa Sanjay Satnam Singh, Pune (IN); Mirza Mohammad Idrees Ul Haq Beigh, Srinagar (IN); Jagdish Balaji Rao, Pune (IN); Nasira Akhter Dar, Anantnag (IN)

(73) Assignee: BALA INDUSTRIES AND ENTERTAINMENT PRIVATE LIMITED, Pune (IN)

( * ) Notice: Subject to any disclaimer, the term of this patent is extended or adjusted under 35 U.S.C. 154(b) by 256 days.

(21) Appl. No.: 16/886,338

(22) Filed: May 28, 2020

(65) Prior Publication Data
US 2020/0377689 A1 Dec. 3, 2020

Related U.S. Application Data

(60) Provisional application No. 62/853,293, filed on May 28, 2019.

(51) Int. Cl.
| | |
|---|---|
| *C08K 3/26* | (2006.01) |
| *C08K 5/00* | (2006.01) |
| *C08L 23/06* | (2006.01) |
| *C08L 25/08* | (2006.01) |
| *C08L 27/06* | (2006.01) |
| *C08L 99/00* | (2006.01) |

(52) U.S. Cl.
CPC .............. *C08K 3/26* (2013.01); *C08K 5/0041* (2013.01); *C08L 23/06* (2013.01); *C08L 25/08* (2013.01); *C08L 27/06* (2013.01); *C08L 99/00* (2013.01); *C08K 2003/262* (2013.01); *C08K 2201/018* (2013.01); *C08L 2201/06* (2013.01)

(58) Field of Classification Search
CPC .. C08K 3/26; C08K 5/0041; C08K 2003/262; C08K 2201/018; C08K 5/0033; C08K 11/00; C08K 3/012; C08L 23/06; C08L 25/08; C08L 27/06; C08L 99/00; C08L 2201/06; C09D 1/00; C09D 7/63; C08J 2323/06; C08J 2325/08; C08J 2327/06
USPC ....................................................... 523/128
See application file for complete search history.

(56) References Cited

U.S. PATENT DOCUMENTS

| | | | | |
|---|---|---|---|---|
| 2,567,362 A | * | 9/1951 | Sophias | C09B 61/00 204/543 |
| 3,750,600 A | * | 8/1973 | Ohsol | F23G 7/12 110/342 |
| 5,750,218 A | * | 5/1998 | Nishida | C08J 5/18 528/417 |
| 8,153,094 B2 | | 4/2012 | Pol et al. | |
| 2002/0183418 A1 | * | 12/2002 | Rosen | C08K 5/37 523/124 |

* cited by examiner

*Primary Examiner* — Hannah J Pak
(74) *Attorney, Agent, or Firm* — Ladas & Parry LLP

(57) ABSTRACT

The present disclosure discloses a novel composition for transforming a non-biodegradable material into a decomposable material. In one embodiment, the non-biodegradable material may be plastic. The composition comprises a carbonate or a bicarbonate compound, a plant extract, a hydrating agent, and a coloring agent. The carbonate or bicarbonate compound, the plant extract and the hydrating agent are mixed in a predetermined ratio by weight along with the coloring agent and maintained in an aqueous medium. In one embodiment, the novel composition is applied on the non-biodegradable material to degrade it into a decomposable form. In another embodiment, the novel composition is mixed with the non-biodegradable material to degrade it into a decomposable form.

20 Claims, 15 Drawing Sheets

| COMPONENT | RATIO OF COMPONENTS (W/W) | | |
|---|---|---|---|
| $XHCO_3$ OR $XCO_3$ | 1500 | 2000 | 2500 |
| LAWSONIA INERMIS | 150 | 200 | 250 |
| WATER | 3000 | 4000 | 5000 |

FIG. 1

COMPOSITION FOR TRANSFORMING POLYETHYLENE INTO A DECOMPOSABLE MATERIAL AND ITS PROCESS OF PRODUCTION THEREOF

CROSS-REFERENCE TO RELATED APPLICATIONS

This application claims priority to U.S. provisional application No. 62/853,293 filed on May 28, 2019, the disclosure of which is incorporated herein in its entirety.

TECHNICAL FIELD OF THE DISCLOSURE

The present disclosure relates generally to a waste management composition and process thereof, and more particularly to a novel composition which may be used for converting non-biodegradable waste such as polyethylene, polystyrene, polyvinyl chloride, and similar complex compounds (man-made) into a decomposable material.

BACKGROUND

Recent studies have indicated that plastic is a main cause of environmental degradation and accounts for approximately ten percent of the total waste generated by humans. The generated plastic waste finds its way into oceans, polluting the water bodies and having hazardous impacts on food chains and human health. It takes 500-1,000 years for a plastic material to degrade. As a result, most of plastic that was ever made still exists in some shape or form.

Polyvinyl chloride, polyethylene, polypropylene and similar monomers are polymerized to form certain synthetic compounds, mainly plastics. Due to the low cost of production, ease of manufacture, flexibility, non-corrosiveness and imperviousness to water, these plastics are used for multiple purposes at different scales. Though, plastics are inexpensive and durable, the main drawback associated with them is their non-biodegradable property, which creates essential problems, for living beings residing on the planet.

Conventional methods for disposal of these synthetic compounds are recycling, landfilling and incineration. However, these methods suffer from drawbacks. The process of recycling has high up-front costs and poses numerous threats to human well-being. Further, during the recycling process, such compounds produce volatile organic compounds and fumes that can harm plants and animal life. The heat needed to melt them during recycling also generates carbon emissions, which eventually contributes to global warming.

Furthermore, dumping of these synthetic compounds in landfills is also not a viable solution as there isn't enough usable space, to safely deposit billions of tons of heavily contaminated material on an annual basis. In the end, the incineration process, adopted for disposal, requires extremely high temperature, and results in the byproducts such as toxic metals, dioxins, etc. Also, these incinerating systems are extremely expensive.

U.S. Pat. No. 8,153,094 discloses an isochoric process for transforming polythene into carbonaceous particles. It requires heating the forms in an environment which is adapted to contain any increase in pressure during the process; maintaining the forms at a temperature and for a time sufficient to cause substantially all C—H and C—C bonds in the forms to break; and cooling the environment. However, the process implemented in the said prior art uses a high temperature range of 650° C. to 700° C. that is difficult to achieve and maintain, and its functional state requires extensive infrastructure.

Thus, in view of the aforementioned problems in the state of the art, there exists a need for a system to convert non-biodegradable plastic into a degradable material, which is inexpensive, minimizes the damages to the environment, and can be implemented with ease.

SUMMARY

One or more shortcomings of prior art are overcome, and additional advantages are provided through the present disclosure. Additional features are realized through techniques of the present disclosure. Other embodiments and aspects of the disclosure are described in detail herein and are considered a part of the present disclosure.

One aspect of the present disclosure discloses a novel composition for transforming a non-biodegradable material into a decomposable material, wherein the said composition comprises, but not limited to, a carbonate or a bicarbonate compound, a plant extract, a hydrating agent and a coloring agent.

Another aspect of the present disclosure discloses a method for producing a composition for transforming a non-biodegradable material into a decomposable material, wherein a carbonate or bicarbonate compound, a plant extract and a hydrating agent are mixed in a predetermined ratio by weight along with the coloring agent to make a homogenous mixture.

In one embodiment of the disclosure, the non-biodegradable material can be derived from polyvinyl chloride, polyethylene, polystyrene, more specifically, plastic compounds.

The present disclosure also discloses one or more methods for using the prepared composition to convert a non-biodegradable material to a decomposable material.

In one embodiment of the present disclosure, the novel composition is made in a predetermined ratio and then applied on the surface of the non-biodegradable material. Upon application, the non-biodegradable material is left for drying and further, it is subjected to thermal decomposition until the non-biodegradable material converts into ash, which is in turn decomposable.

In another embodiment of the present disclosure, the composition is made in another predetermined ratio and then mixed with the non-biodegradable material itself. After mixing, the mixture is subjected to thermal decomposition until the non-biodegradable material converts into ash, which is decomposable.

Foregoing summary is illustrative only and is not intended to be in any way limiting. In addition to illustrative aspects, embodiments, and features described above, further aspects, embodiments, and features will become apparent by reference to drawings and following detailed description.

BRIEF DESCRIPTION OF DRAWINGS

FIG. 1 illustrates the ratios used for preparing the composition according to one embodiment of the present disclosure.

DETAILED DESCRIPTION

Figure 2:
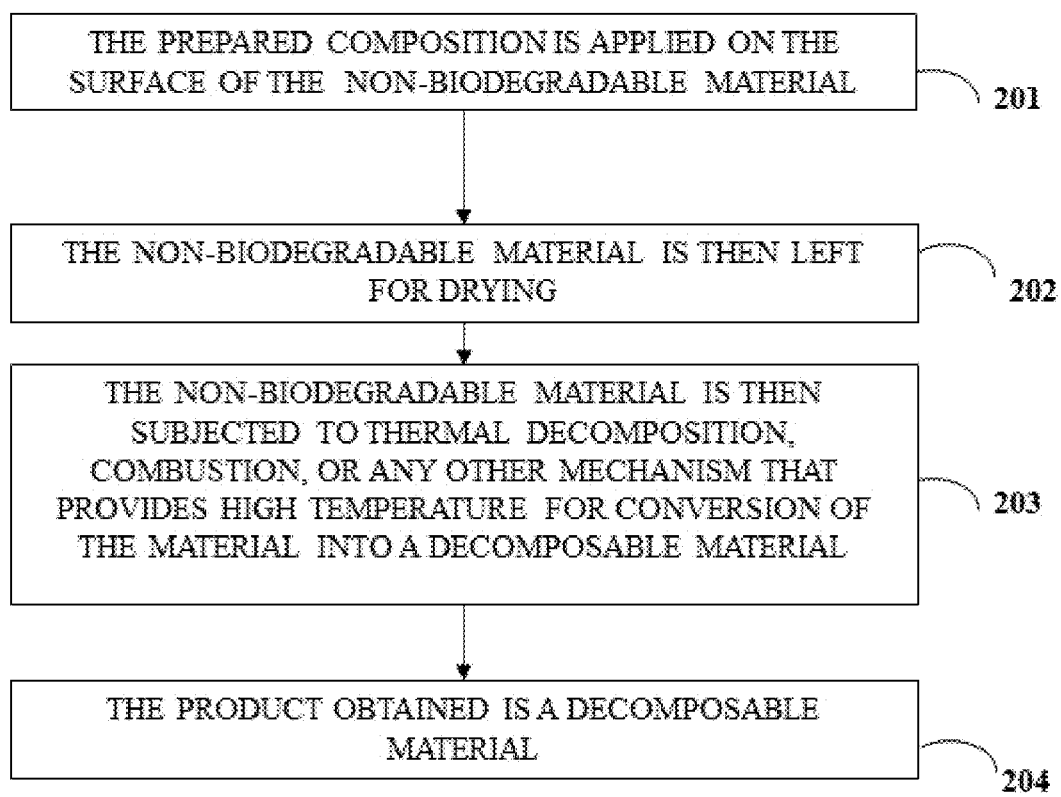
FIG. 2 illustrates the process for transforming a non-biodegradable material into a decomposable material according to one embodiment of the present disclosure.

In following detailed description of embodiments of present disclosure, numerous specific details are set forth in order to provide a thorough understanding of the embodiments of the disclosure. However, it will be obvious to one skilled in art that the embodiments of the disclosure may be practiced without these specific details.

References in the present disclosure to "one embodiment" or "an embodiment" mean that a composition or method described in connection with the embodiment is included in at least one embodiment of the disclosure.

In the present disclosure, word "example" is used herein to mean "serving as an example, instance, or illustration." Any embodiment or implementation of present subject matter described herein as "example" is not necessarily to be construed as preferred or advantageous over other embodiments.

While the disclosure is susceptible to various modifications and alternative forms, specific embodiment thereof has been shown by way of example in drawings and will be described in detail below. It should be understood, however that it is not intended to limit the disclosure to the forms disclosed, but on contrary, the disclosure is to cover all modifications, equivalents, and alternative falling within scope of the disclosure.

Terms such as "comprises", "comprising", or any other variations thereof, are intended to cover a non-exclusive inclusion, such that a composition or method that comprises a list of compounds or steps does not include only those compounds or steps but may include other compounds or steps not expressly listed or inherent to such composition or method. In other words, one or more elements in a composition or method proceeded by "comprises . . . a" does not, without more constraints, preclude existence of other elements or additional elements in the composition or method.

In following detailed description of the embodiments of the disclosure, reference is made to drawings that form a part hereof, and in which are shown by way of illustration specific embodiments in which the disclosure may be practiced. These embodiments are described in enough detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure discloses a novel composition that may enable the conversion of non-biodegradable material derived from polyvinyl chloride, polyethylene, polystyrene, more specifically, plastic compounds into a decomposable material.

The composition may be in the form of but not limited to, a semi-solid solution, a complete aqueous solution, a solid mixture, or in any other form physically. The said composition is made with uniform consistency.

The said composition includes, but not limited to:
i. a carbonate or a bicarbonate compound,
ii. a plant extract,
iii. a hydrating agent, and
iv. a coloring agent.

The carbonate or bicarbonate compound is having a formula of but not limited to, XCO3 or XHCO3, wherein X can be Beryllium, Magnesium, Calcium, Strontium, Barium or any metal that may belong to periodic metal classification of alkaline earth metals. The carbonate or bicarbonate compound may be $CaCO_3$ (hereinafter referred to as Calcium Carbonate). In embodiments the Calcium Carbonate may be obtained from a plurality of sources, including, but not limited to, chalk powder, eggshells, seashells, or the like.

In embodiments, the plant that may be used for producing the plant extract may be a member of the family of Lythraceae. Furthermore, the plant extract may be taken from the species *Lawsonia inermis*, also known as Hina or Heena, Henna tree, the Mignonette tree, and the Egyptian Privet. It is a shrub or a small tree (2 m-6 m in height), which may be spiny, multi-branched with spine tipped branchlets. The comparatively young branches are quadrangular and green in color, but they turn red as they age. The plant species is found in tropical and sub-tropical regions of the world and more specially in Western and Southern Asia such as India and Pakistan, semi-arid zones, northern Africa, and northern Australia etc.

In embodiments, the hydrating agent that may be used in the composition may be either portable or distilled or tea water. Furthermore, the hydrating agent may be used for producing the composition in an aqueous medium.

In embodiments, the coloring agent may be used to bind the one or more components present in the said composition. The coloring agent can be a non-toxic or natural coloring agent. Further, the coloring agents used can include, but not limited to, Allura Red, Black PN, azo-dyes and Carmoisine or any other non-toxic or natural coloring agent that may be used as an adhesive for binding the composition to the non-biodegradable material.

In embodiments, the composition can be produced by mixing the carbonate or bicarbonate compound, the plant extract and the hydrating agent in a predetermined ratio by weight along with the coloring agent to make a homogenous mixture in a neutral aqueous medium, with a pH ranging from 7 to 9, wherein the carbonate or bicarbonate compound constitutes more than 30 weight percent and less than 70 weight percent of the composition and the plant extract constitutes more than 3 weight percent and less than 70 weight percent of the composition.

The present disclosure also discloses several methods and its related embodiments for using the prepared composition to convert a non-biodegradable material to a decomposable material.

In one embodiment of the present disclosure, the composition can be prepared by mixing the bicarbonate or carbonate compound, the plant extract and the hydrating agent in three predetermined ratios as mentioned in FIG. 1 and then mixing it with the coloring agent to produce a homogenous mixture. The ratios enumerated may be used for preparing the composition and are described as below:

a) ($XHCO_3$ OR $XCO_3$):(*Lawsonia inermis*):(Hydrating Agent)=1500:150:3000 (w/w)

b) ($XHCO_3$ OR $XCO_3$):(*Lawsonia inermis*):(Hydrating Agent)=2000:200:4000 (w/w)

c) ($XHCO_3$ OR $XCO_3$):(*Lawsonia inermis*):(Hydrating Agent)=2500:250:5000 (w/w)

Upon preparation of the said composition, it is essential to use the composition that may be able to convert at a non-biodegradable material into a decomposable material. With regard to the same, FIG. 2 illustrates a process for transforming a non-biodegradable material into a decomposable material. As shown in the FIG. 2, at step 201, the prepared composition is applied on the flat surface of the non-biodegradable material. At step 202, the non-biodegradable material may be sun-dried or may naturally dry such that the composition may find the optimum threshold to remain on the non-biodegradable material. Further, after the composition has dried, the non-biodegradable material is then subjected to, but not limited to, thermal decomposition, combustion, or any other mechanism that may provide high temperature range for conversion of the non-biodegradable material into a decomposable material, as illustrated at step 203. Lastly at step 204, the final residue that is obtained is a decomposable material, such as ash.

Figure 3:
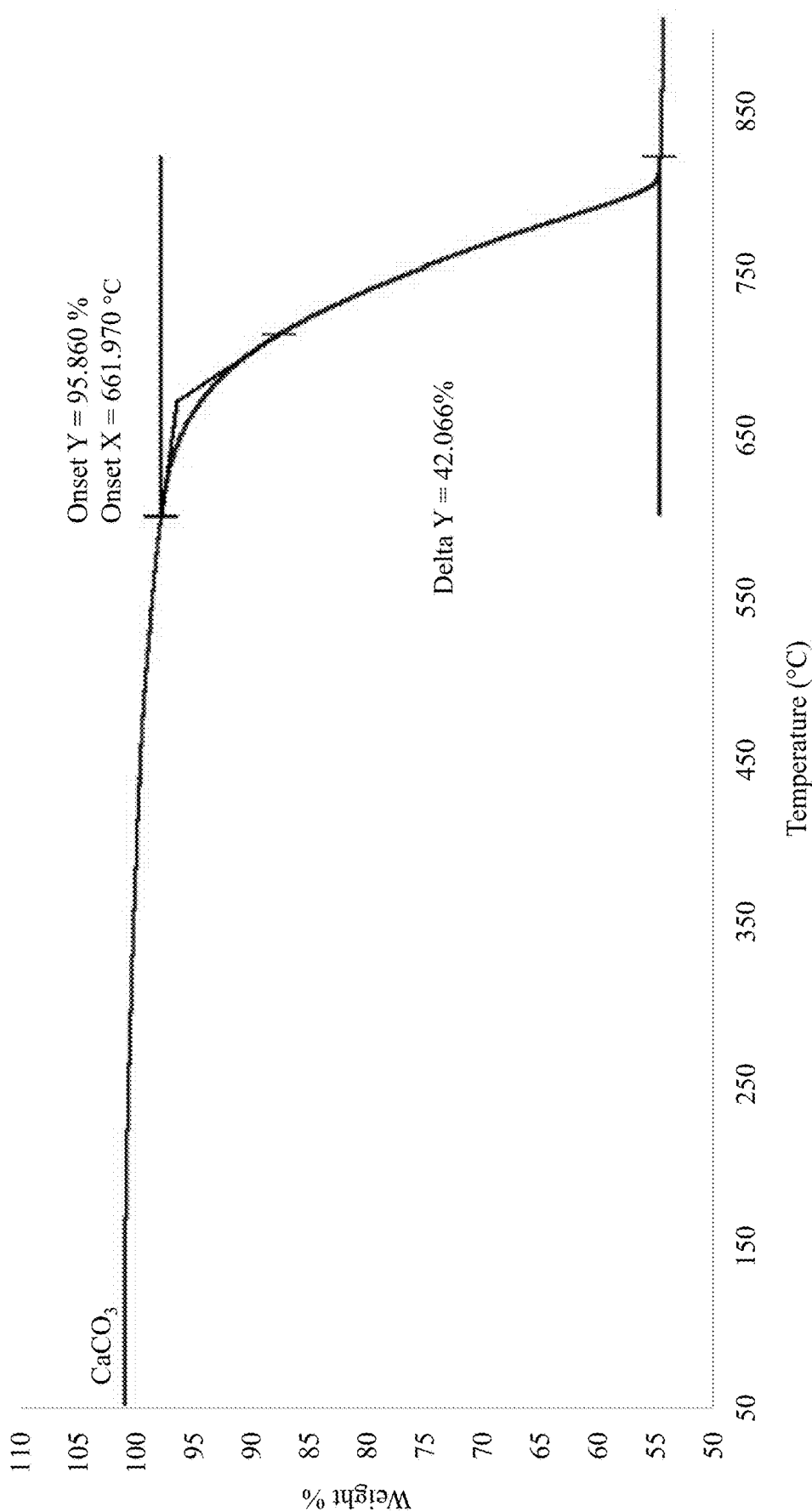
FIG. 3 illustrates thermogravimetric analysis of Calcium Carbonate plotted as weight percentage vs temperature.

FIG. 3 describes thermogravimetric analysis of Calcium Carbonate plotted as weight percentage vs temperature. In an embodiment, the thermogravimetric analysis of Calcium Carbonate may enumerate the variation of the weight of the compound in comparison to the temperature increase and/or decrease. The analysis is performed in the temperature range of 50° C.-900° C. with a scanning rate of 10° C./min in purge atmosphere of Nitrogen. It can be inferred from FIG. 3 that the rate of change in the weight of Calcium Carbonate starts at an underlying temperature of 661.97° C. It can also be inferred from the graph that the maximum weight loss occurred during the analysis is 42.06 percentage of the total weight of the sample of Calcium Carbonate.

Figure 4:
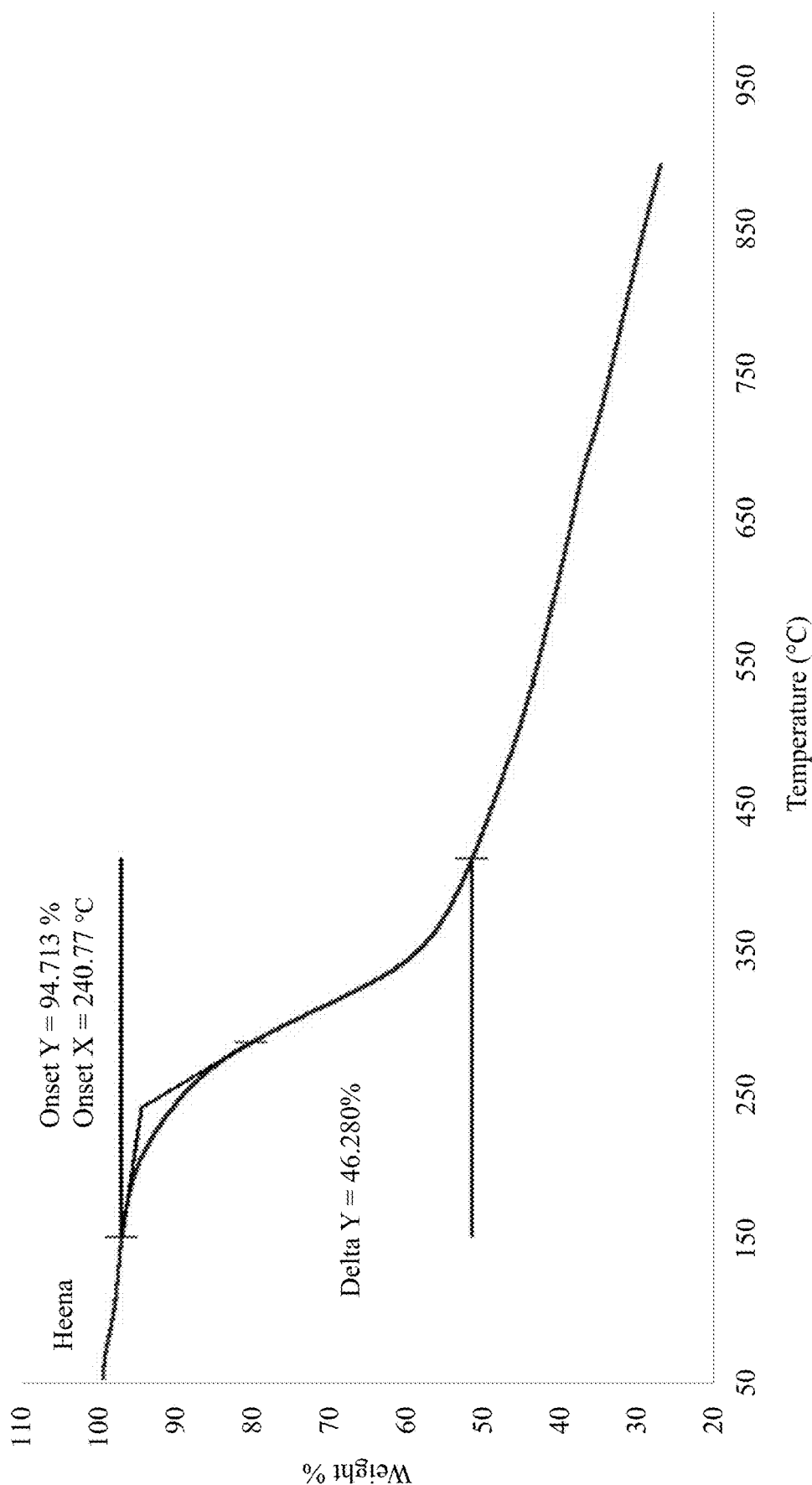
FIG. 4 illustrates thermogravimetric analysis of the plant extract of *Lawsonia inermis* (Heena) plotted as weight percentage vs temperature.

FIG. 4 describes thermogravimetric analysis of the plant extract of *Lawsonia inermis* plotted as weight percentage vs temperature. In an embodiment, the thermogravimetric analysis of *Lawsonia inermis* may enumerate the variation of the weight of the compound in comparison to the temperature increase and/or decrease. The analysis is performed in the temperature range of 50° C.-900° C. with a scanning rate of 10° C./min in purge atmosphere of Nitrogen. It can be inferred from the graph that maximum change in the weight *Lawsonia inermis*) starts at 240.77° C. It can also be inferred from the graph that the maximum weight loss occurred during the analysis is 46.28 percentage of the total weight of the sample of *Lawsonia inermis*.

Working Example 1—Sample of Polyethylene Sheet

In an embodiment, a sample of polyethylene may be taken to elucidate the degradation of the non-biodegradable material at various temperature levels. In embodiments, the polyethylene sample may be a sheet, a cylinder, a solid body, and the like. In one embodiment of the disclosure, the color of the polyethylene sheet may be black with (R,G,B) values (0,0,0).

Figure 5:
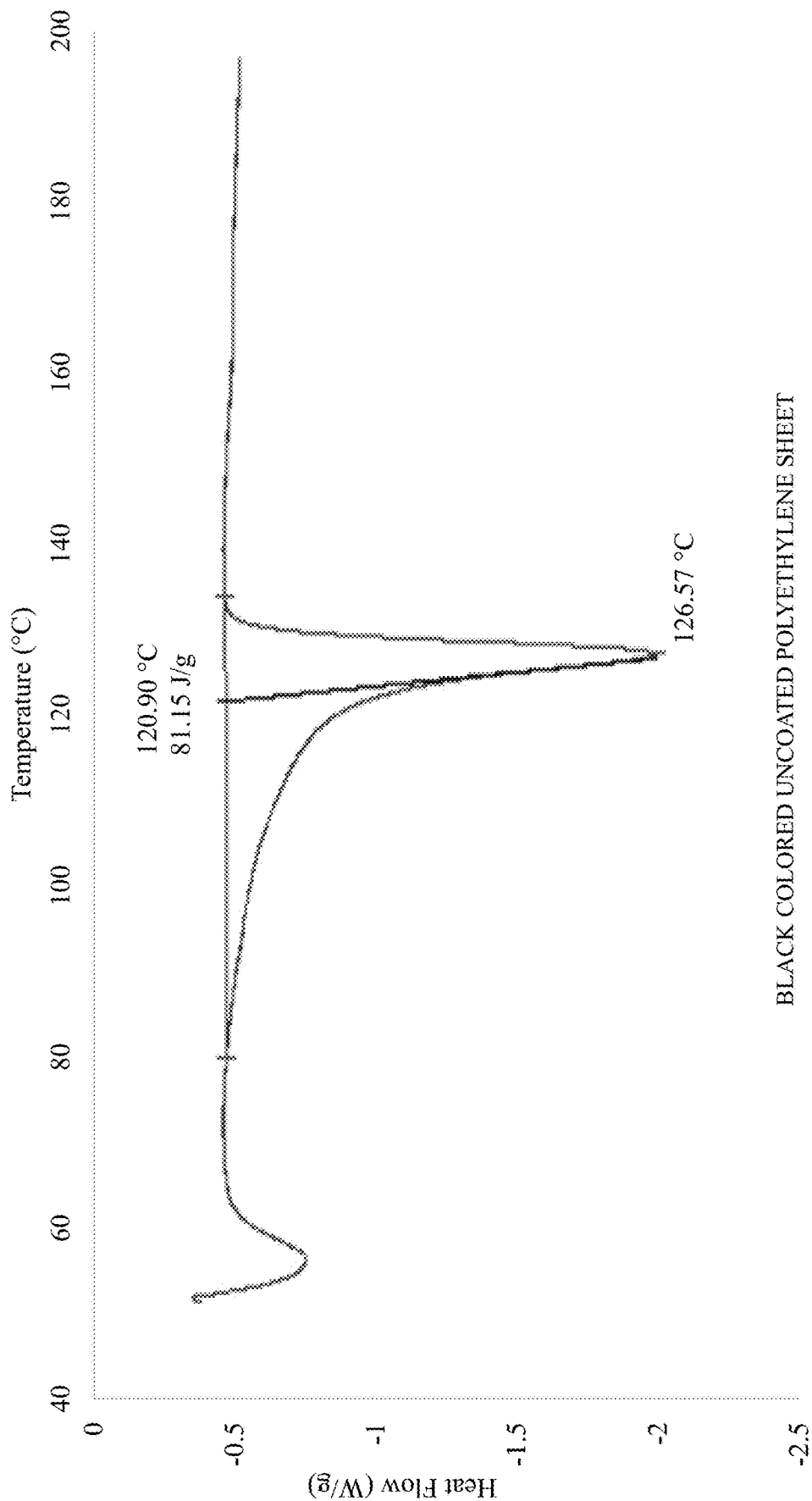
FIG. 5 illustrates Differential Scanning Calorimetry (DSC) analysis of uncoated black colored polyethylene sheet plotted as heat flow (W/g) vs temperature (° C.).

FIG. 5 shows Differential Scanning Calorimetry (DSC) analysis of uncoated black colored polyethylene sheet plotted as heat flow (W/g) vs temperature (° C.). The Differential Scanning Calorimetry (DSC) analysis may enumerate the variation of the heat flow in the compound in comparison to its temperature increase and/or decrease. The Differential Scanning Calorimetry (DSC) analysis shows that the melting point of uncoated black colored polyethylene sheet is 126.5° C.

Figure 6:
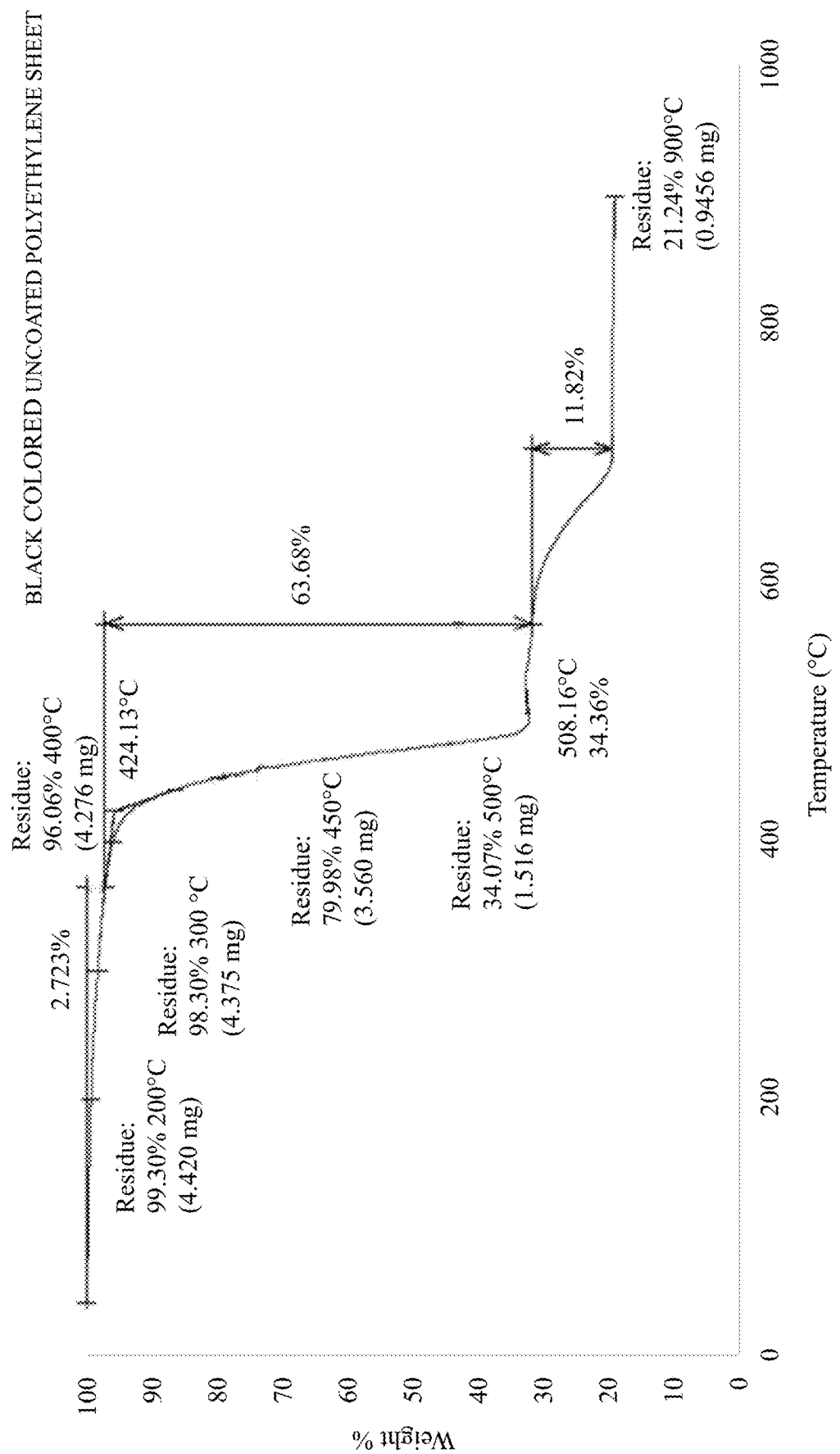
FIG. 6 illustrates thermogravimetric analysis of an uncoated black colored polyethylene sheet plotted as weight percentage vs temperature.

FIG. 6 shows thermogravimetric analysis of uncoated black colored polyethylene sheet plotted as weight percentage vs temperature. In embodiments, uncoated black colored polyethylene sheet mentioned here refers to the black colored polyethylene sheet sample on which no coating or composition is applied. The polyethylene used is Low Density Polyethylene (LDPE) filled with approximately a filling material. The filling material can be an organic including, but not limited to, polyester fiber, hoot filler, etc. The filling material is essentially added in Low Density Polyethylene (LDPE) to improve its physical and mechanical properties within a percentage range of 20-25% (w/w). The analysis is performed for the sample of size 4.4510 mg in the temperature range of 40° C.-900° C. with a scanning rate of 10° C./min in the purge atmosphere of nitrogen. It can be inferred from the graph that at 900° C., the residue left is 21.24% of the total weight. The thermogravimetric analysis of uncoated black colored polyethylene sheet shows total weight loss of approx. 77% and residue of 21.24%.

Figure 7:
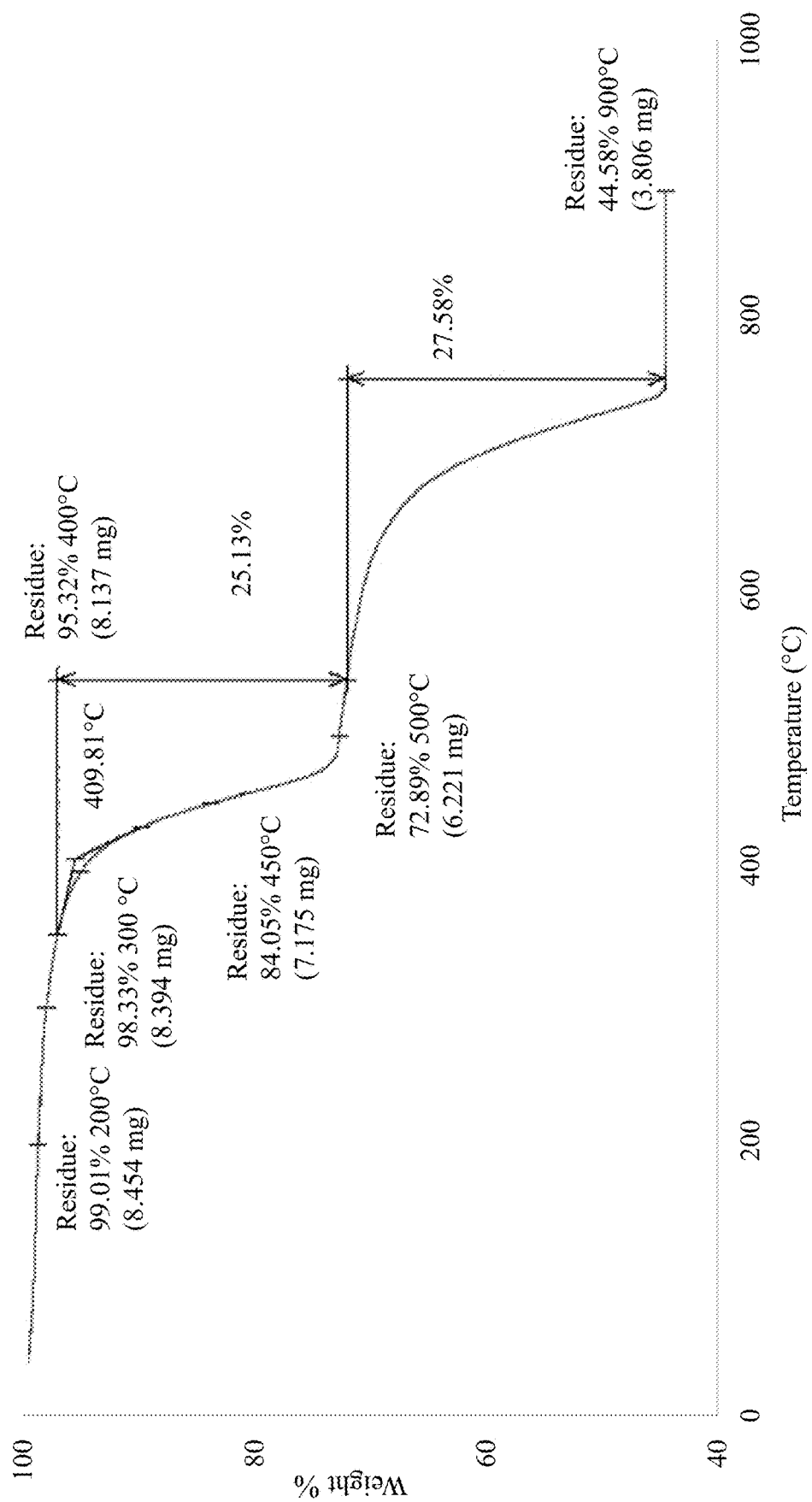
FIG. 7 illustrates thermogravimetric analysis of a black colored polyethylene sheet, which is coated with the prepared composition, plotted as weight percentage vs temperature.

FIG. 7 shows thermogravimetric analysis of coated black colored polyethylene sheet plotted as weight percentage vs temperature. In embodiments, the coated black colored polyethylene sheet mentioned here refers to the black colored polyethylene sheet sample on which the prepared composition is applied as per the one embodiment of the present disclosure. The analysis is performed for the sample of size 8.5360 mg in the temperature range of 40-900° C. with a scanning rate of 10° C./min in the purge atmosphere of nitrogen. It can be inferred from the graph that at 900° C., the residue left is 44.58% of the total weight.

Figure 8:
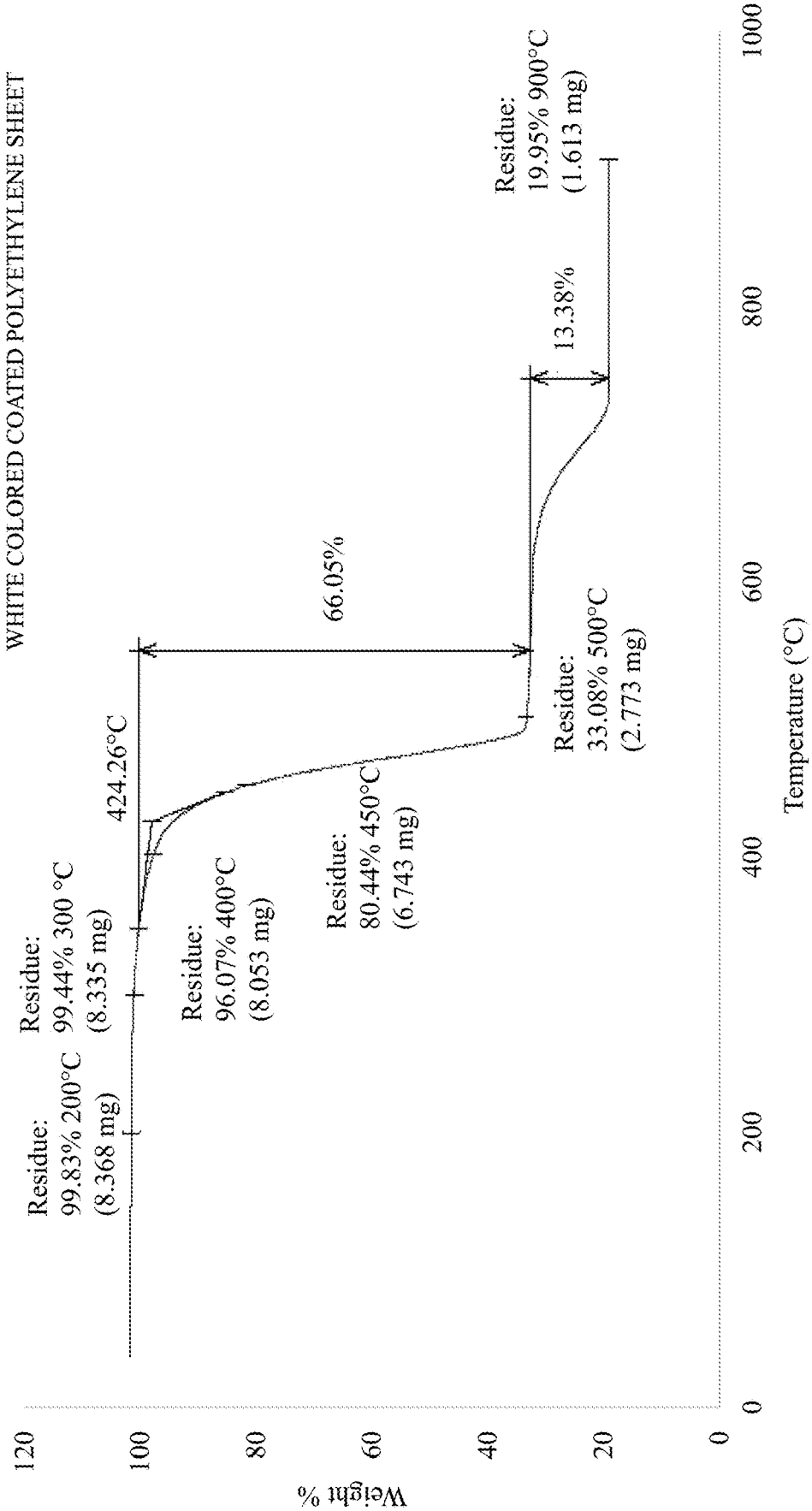
FIG. 8 illustrates thermogravimetric analysis of white colored polyethylene sheet, which is coated with the prepared composition, plotted as weight percentage vs temperature.

Another sample of polyethylene sheet is taken to explain the degradation of the material at various levels. In one embodiment of the disclosure, the color of the polyethylene sheet can be white with (R,G,B) values (255,255,255). FIG. 8 shows thermogravimetric analysis of coated white colored polyethylene sheet plotted as weight percentage vs temperature. Coated white colored polyethylene sheet mentioned here refers to the white colored polyethylene sheet sample on which the prepared composition is applied as per the one embodiment of the present disclosure. The analysis is performed for the sample of size 8.3820 mg in the temperature range of 40-900° C. with a scanning rate of 10° C./min in the purge atmosphere of nitrogen. It can be inferred from the graph that at 900° C., the residue left is 19.25% of the total weight.

In one embodiment of the disclosure, the sample of the polyethylene sheet, that has been taken for the analysis, can have multiple colors. In another embodiment of the disclosure the sample of the polyethylene sheet, that has been taken for the analysis, can have different levels of transparency or opacity.

Figure 9:
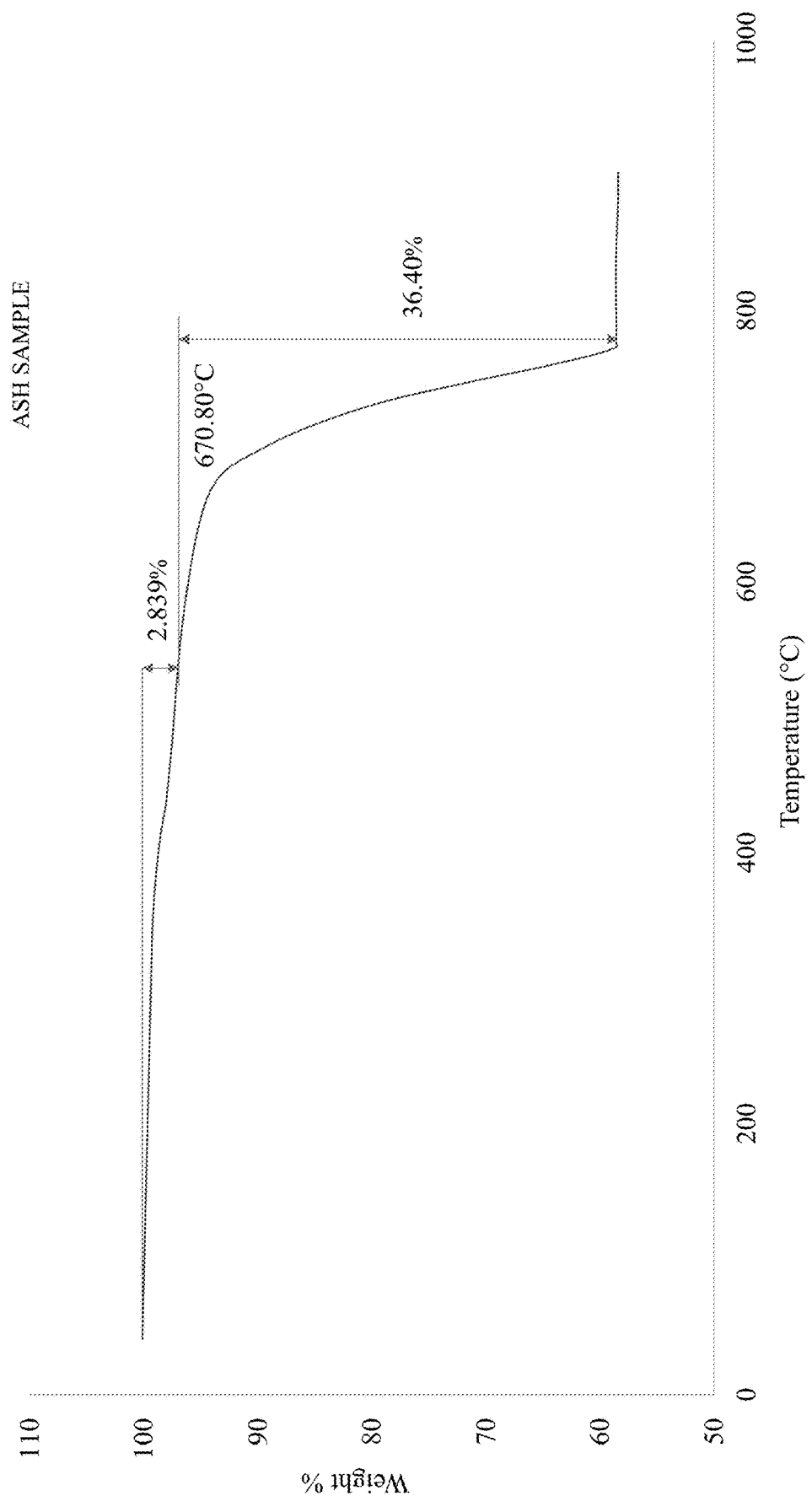
FIG. 9 illustrates thermogravimetric analysis of the decomposable sample (ash) obtained after the thermal decomposition of the polyethylene sheets.

Here in the case of polyethylene sheets, the residue left is a decomposable material (ash). FIG. 9 shows thermogravimetric analysis of the obtained decomposable material (ash sample). The analysis is performed for the sample of size 8.0190 mg in the temperature range up to 1000° C. with a scanning rate of 10° C./min in the purge atmosphere of nitrogen. As a result of the analysis, there was no plastic material found in the ash sample.

In another embodiment of the present disclosure, the composition can be prepared using three predetermined ratios for mixing carbonate or bicarbonate compound (XHCO3 OR XCO3) with the plant extract (*Lawsonia inermis*), and then mixing it with the coloring agent and the hydrating agent (distilled/portable/tea water). The ratios for carbonate or bicarbonate compound to *Lawsonia inermis* are given as follows:
  a) (XHCO3 OR XCO3):(*Lawsonia inermis*)=1:3 (w/w)
  b) (XHCO3 OR XCO3):(*Lawsonia inermis*)=1:1 (w/w)
  c) (XHCO3 OR XCO3):(*Lawsonia inermis*)=3:1 (w/w)

Figure 10:
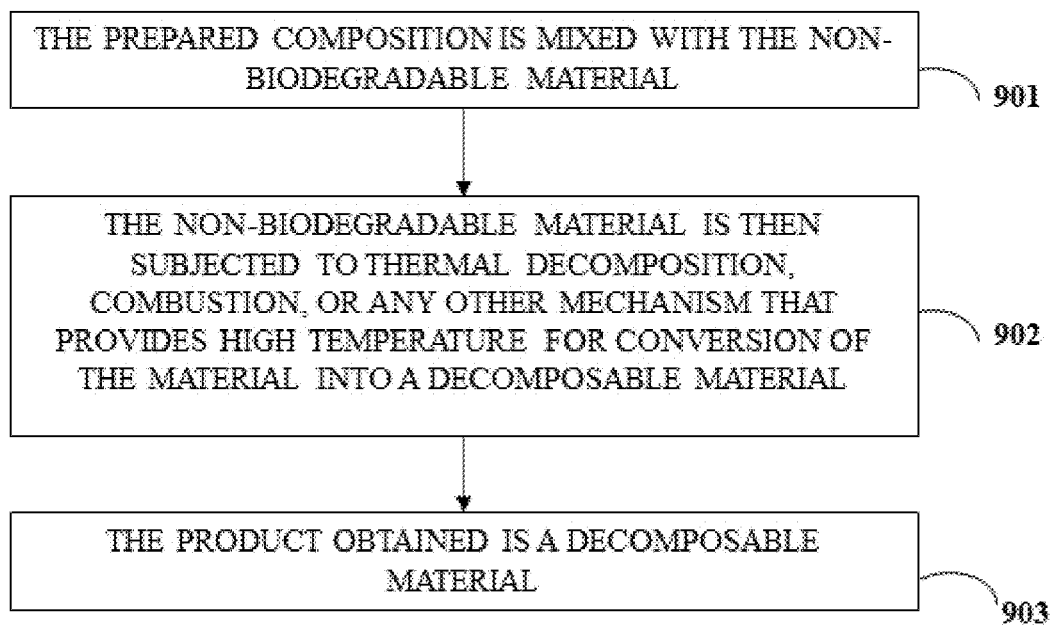
FIG. 10 illustrates the process for transforming non-biodegradable material into a decomposable material according to another embodiment of the present disclosure.

After the composition is prepared, it follows a method by which it can be used to make non-biodegradable material into a decomposable material. FIG. 10 illustrates a process for transforming the non-biodegradable material into a decomposable material according to the embodiment of the present disclosure. At step 901, the prepared composition is mixed with the non-biodegradable material. At step 902, the mixture is subjected to thermal decomposition, combustion, or any other mechanism that provides high temperature for conversion of the non-biodegradable material into a decomposable material. In the end at step 903, the product obtained is a decomposable material, that is ash.

Working Example 2—Sample of Polypropylene

Figure 11:
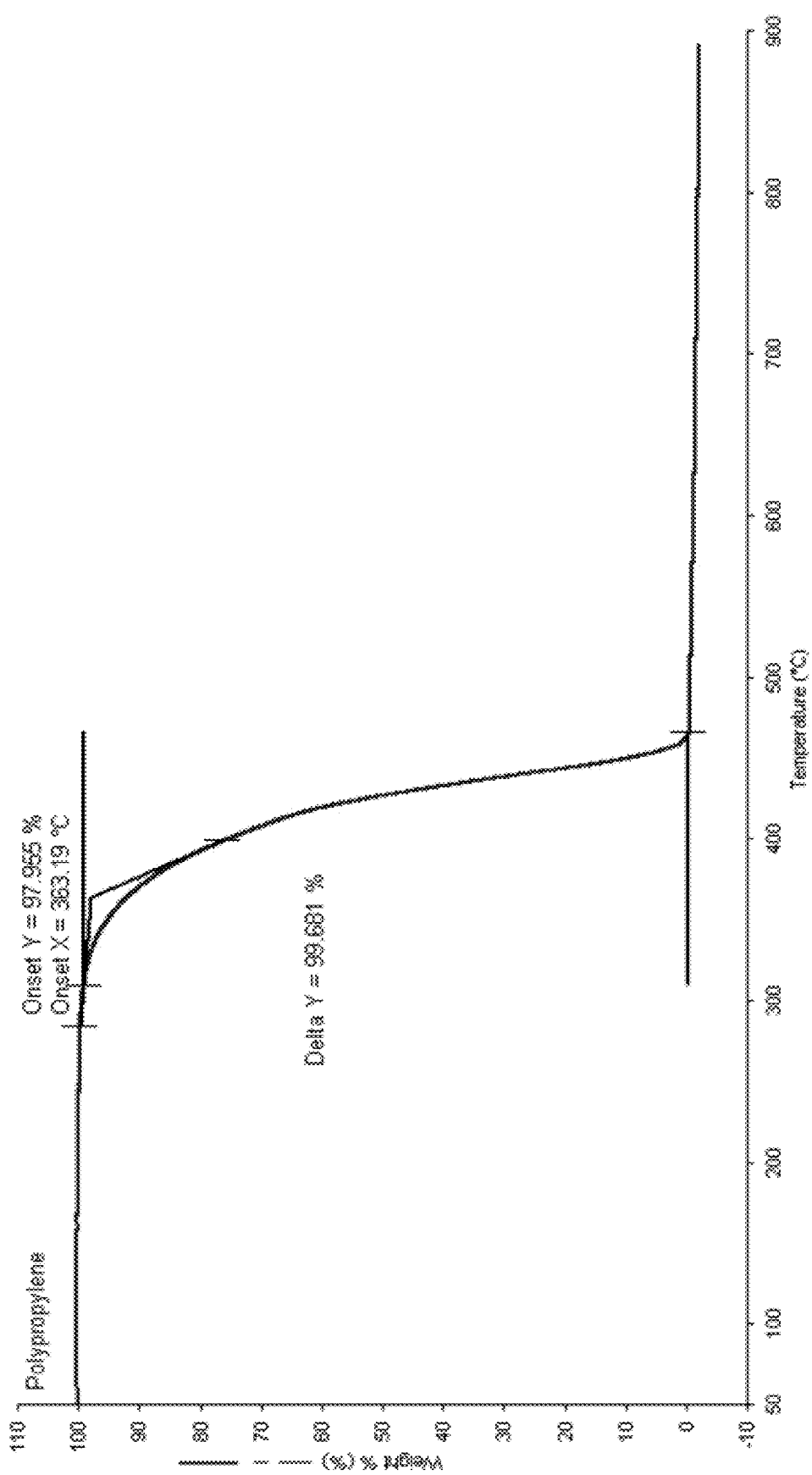
FIG. 11 illustrates thermogravimetric analysis of polypropylene plotted as weight percentage vs temperature.

A sample of polypropylene is taken to explain the degradation of the material at various levels. FIG. 11 shows thermogravimetric analysis of polypropylene plotted as weight percentage vs temperature. The analysis is performed in the temperature range of 50-900° C. with a scanning rate of 10° C./min in the purge atmosphere of nitrogen. It can be inferred from the graph that maximum change in weight starts at 363.19° C.

Figure 12:
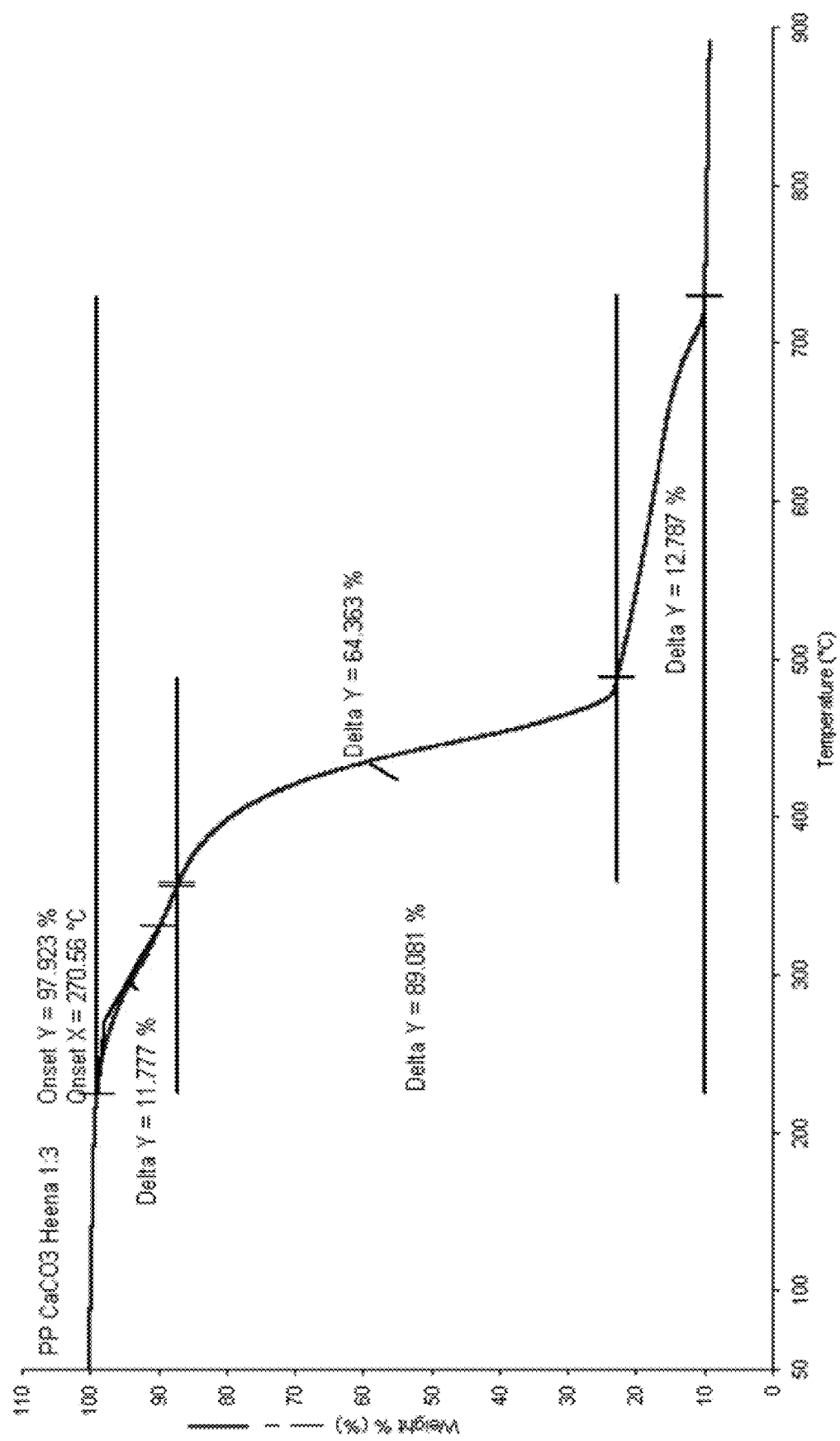
FIG. 12 illustrates thermogravimetric analysis of polypropylene mixed with the prepared composition in the ratio of 65:35 (w/w), wherein the prepared composition contains $CaCO_3$ and *Lawsonia inermis* in the ratio of 1:3 (w/w).

FIG. 12 shows thermogravimetric analysis of polypropylene mixed with the prepared composition in the ratio of 65:35 (w/w), wherein the prepared composition contains $CaCO_3$ and *Lawsonia inermis* (Heena) in the ratio of 1:3 (w/w). The thermogravimetric analysis is plotted as weight percentage vs temperature. The analysis is performed in the temperature range of 50-900° C. with a scanning rate of 10° C./min in the purge atmosphere of nitrogen.

Figure 13:
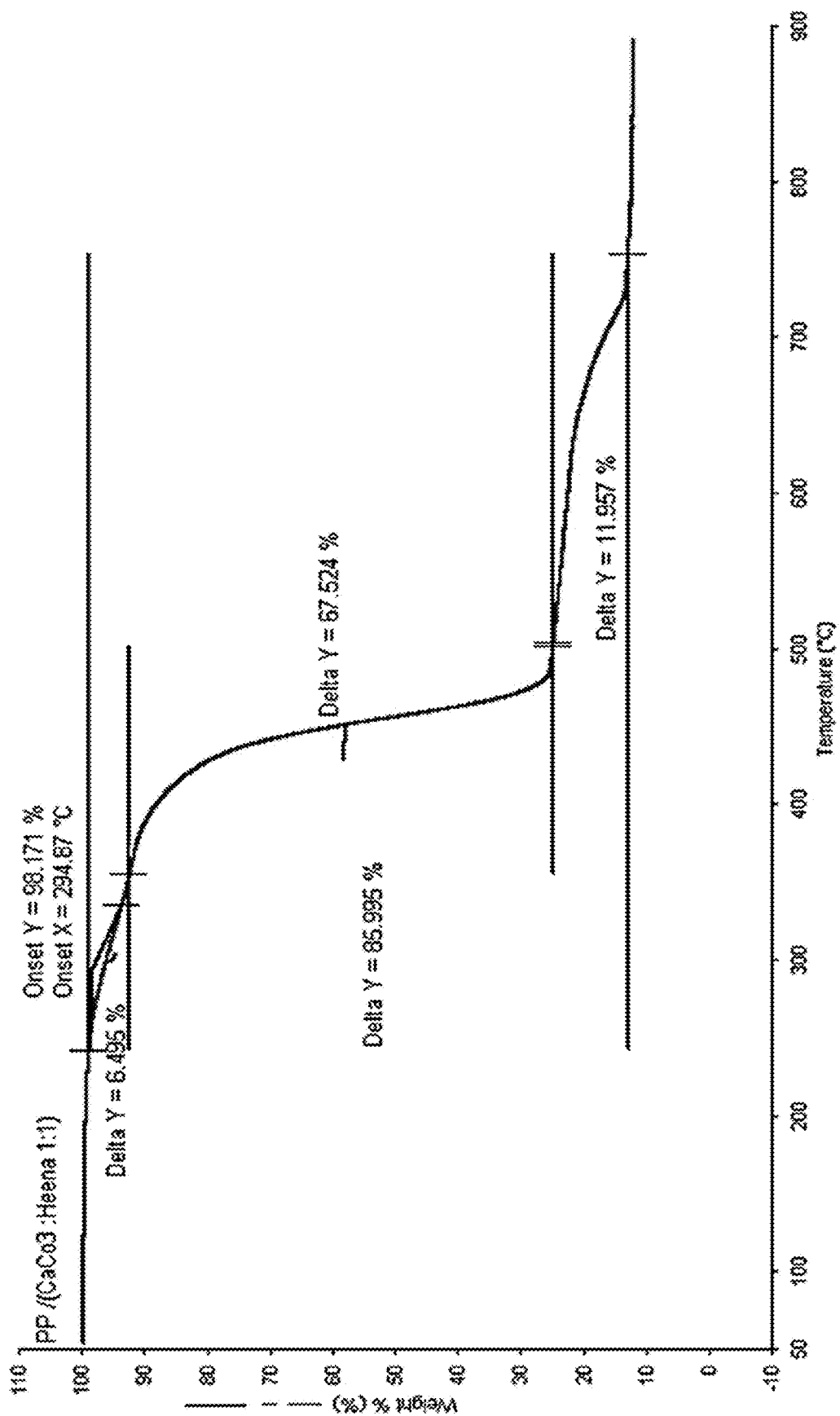
FIG. 13 illustrates thermogravimetric analysis of polypropylene mixed with the prepared composition in the ratio of 65:35 (w/w), wherein the prepared composition contains $CaCO_3$ and *Lawsonia inermis* in the ratio of 1:1 (w/w).

FIG. 13 shows thermogravimetric analysis of polypropylene mixed with the prepared composition in the ratio of 65:35 (w/w), wherein the prepared composition contains $CaCO_3$ and *Lawsonia inermis* (Heena) in the ratio of 1:1 (w/w). The thermogravimetric analysis is plotted as weight percentage vs temperature. The analysis is performed in the temperature range of 50-900° C. with a scanning rate of 10° C./min in the purge atmosphere of nitrogen.

Figure 14:
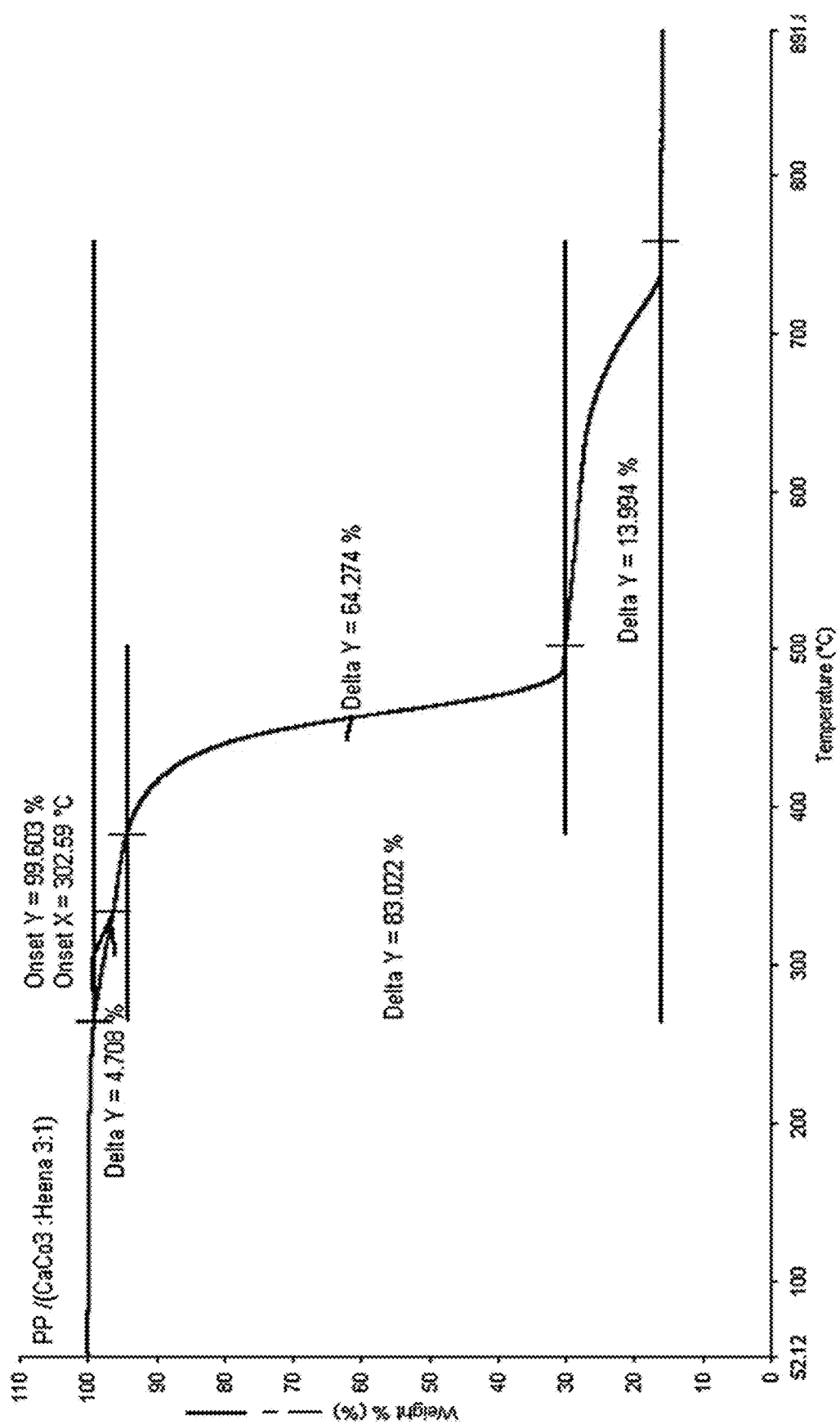
FIG. 14 illustrates thermogravimetric analysis of polypropylene mixed with the prepared composition in the ratio of 65:35 (w/w), wherein the prepared composition contains $CaCO_3$ and *Lawsonia inermis* in the ratio of 3:1 (w/w).

FIG. 14 shows thermogravimetric analysis of polypropylene mixed with the prepared composition in the ratio of 65:35 (w/w), wherein the prepared composition contains $CaCO_3$ and *Lawsonia inermis* (Heena) in the ratio of 3:1 (w/w). The thermogravimetric analysis is plotted as weight percentage vs temperature. The analysis is performed in the temperature range of 50-900° C. with a scanning rate of 10° C./min in the purge atmosphere of nitrogen.

Figure 15:
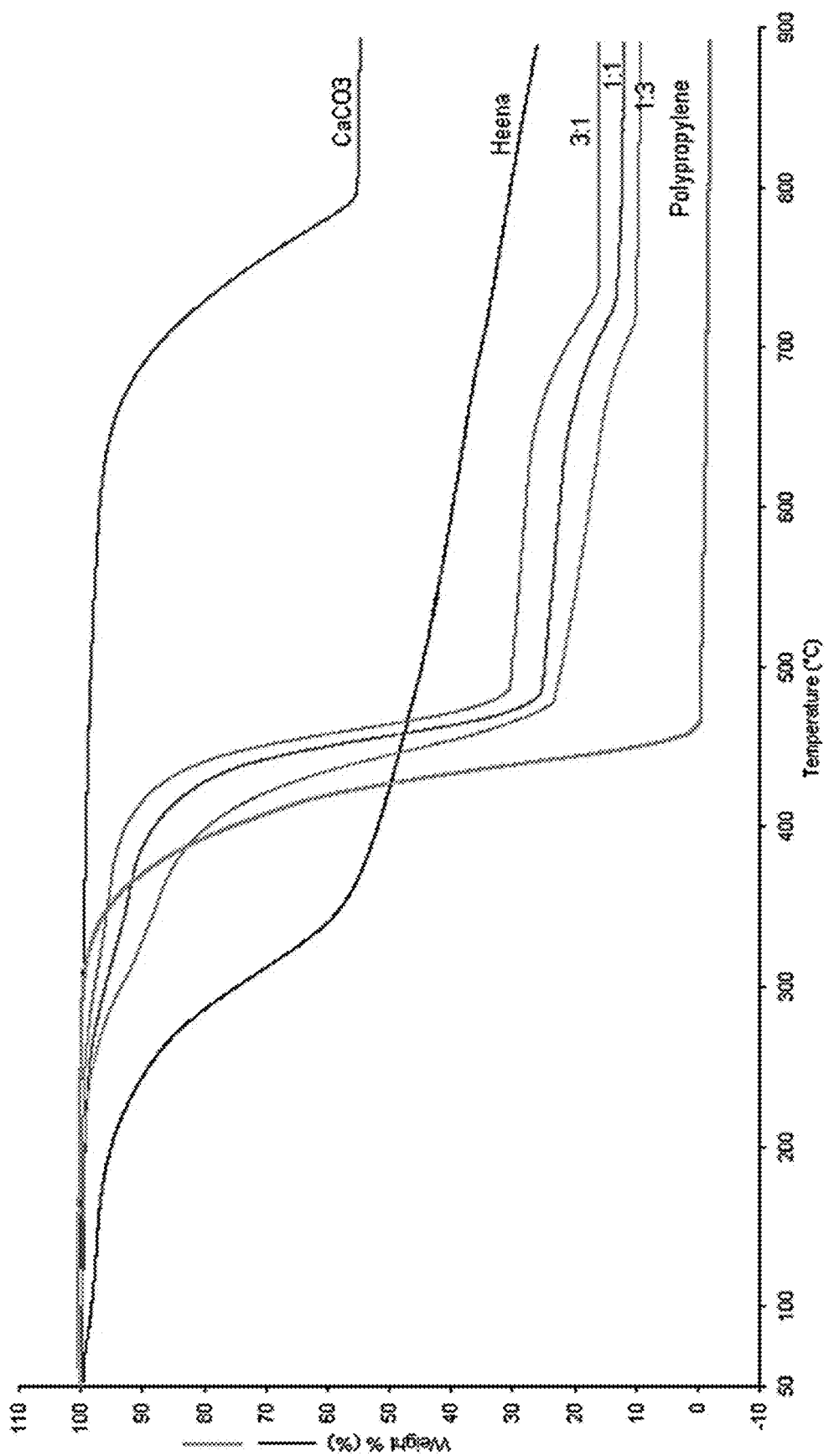
FIG. 15 illustrates an overlaying thermogravimetric analysis graph for three ratios of $CaCO_3$ and *Lawsonia inermis*, along with the thermogravimetric analysis graph of $CaCO_3$, *Lawsonia inermis* and polypropylene.

FIG. 15 shows an overlaying thermogravimetric analysis graph for three ratios of *Lawsonia Inermis* (Heena) and polypropylene, along with the thermogravimetric analysis of $CaCO_3$, *Lawsonia Inermis* (Heena) and polypropylene. It has been observed that the remaining residue left is of higher quantity when the composition is having *Lawsonia Inermis* and $CaCO_3$ in ratio of 1:3 (w/w). It has also been observed that the least plastic content is obtained when the composition is having *Lawsonia Inermis* and $CaCO_3$ in ratio of 1:3 (w/w).

The invention claimed is:
1. A composition for transforming a non-biodegradable material into a decomposable material, said composition comprising:
  a) a carbonate or a bicarbonate compound, wherein the carbonate or bicarbonate compound constitutes more than 30 weight percent and less than 70 weight percent of the composition,
  b) a plant extract of a plant family of Lythraceae, wherein the plant extract constitutes more than 3 weight percent and less than 70 weight percent of the composition, and
  c) a hydrating agent for uniformly dissolving the carbonate or the bicarbonate compound and the plant extract of the plant family of Lythraceae.

2. The composition as claimed in claim 1, wherein the hydrating agent dissolves the carbonate or the bicarbonate compound and the plant extract of the plant family of Lythraceae to form a semi-solid solution or a complete aqueous solution or a solid mixture.

3. The composition as claimed in claim 1, wherein the composition further includes a coloring agent, wherein the coloring agent binds the carbonate or the bicarbonate compound and the plant extract of the plant family of Lythraceae of the composition.

4. The composition as claimed in claim 1, wherein the carbonate or bicarbonate compound is having formula $XCO_3$ or $XHCO_3$, wherein X is an alkaline earth metal.

5. The composition as claimed in claim 1, wherein the hydrating agent is portable or distilled water with pH ranging from 7 to 9.

6. The composition as claimed in claim 1, wherein the hydrating agent is tea water with pH ranging from 7 to 9.

7. The composition as claimed in claim 3, wherein the coloring agent is a non-toxic coloring agent.

8. The composition as claimed in claim 3, wherein the coloring agent is a natural coloring agent.

9. The composition as claimed in claim 1, wherein the composition is maintained as a semi-solid solution, a complete aqueous solution or a solid mixture with a pH range between 7 to 9.

10. The composition as claimed in claim 1, wherein the non-degradable material is at least one selected from the group consisting of a polyethylene compound, a polystyrene compound, and a polyvinyl chloride compound.

11. A method for producing a composition for transforming a non-biodegradable material into a decomposable material, said composition comprising:

a) a carbonate or a bicarbonate, wherein the carbonate or bicarbonate compound constitutes more than 30 weight percent and less than 70 weight percent of the composition, b) a plant extract of a plant family of Lythraceae, wherein the plant extract constitutes more than 3 weight percent and less than 70 weight percent of the composition, and c) a hydrating agent for uniformly dissolving the carbonate or the bicarbonate compound and the plant extract of the plant family of Lythraceae, wherein the carbonate or bicarbonate, the plant extract of the plant family of Lythraceae, and the hydrating agent are mixed to make a homogenous mixture.

12. The method of producing a composition as claimed in claim 11, wherein the hydrating agent dissolves the carbonate or the bicarbonate compound and the plant extract of the plant family of Lythraceae to form a semi-solid solution or a complete aqueous solution or a solid mixture.

13. The method of producing a composition as claimed in claim 11, wherein the composition includes a coloring agent, wherein the coloring agent binds the carbonate or the bicarbonate compound and the plant extract of the plant family of Lythraceae of the composition.

14. The method of producing a composition as claimed in claim 11, wherein the carbonate or bicarbonate compound is having formula $XCO_3$ or $XHCO_3$, wherein X is an alkaline earth metal.

15. The method of producing a composition as claimed in claim 11, wherein the hydrating agent is portable or distilled water with pH ranging from 7 to 9.

16. The method of producing a composition as claimed in claim 11, wherein the hydrating agent is tea water with pH ranging from 7 to 9.

17. The composition as claimed in claim 13, wherein the coloring agent is a non-toxic coloring agent.

18. The composition as claimed in claim 13, wherein the coloring agent is a natural coloring agent.

19. The composition as claimed in claim 11, wherein the composition is maintained as a semi-solid solution, a complete aqueous solution or a solid mixture with a pH range between 7 to 9.

20. The method of producing a composition as claimed in claim 11, wherein the non-biodegradable material is at least one selected from the group consisting of a polyethylene compound, a polystyrene compound, and a polyvinyl chloride compound.

* * * * *